UNITED STATES PATENT OFFICE.

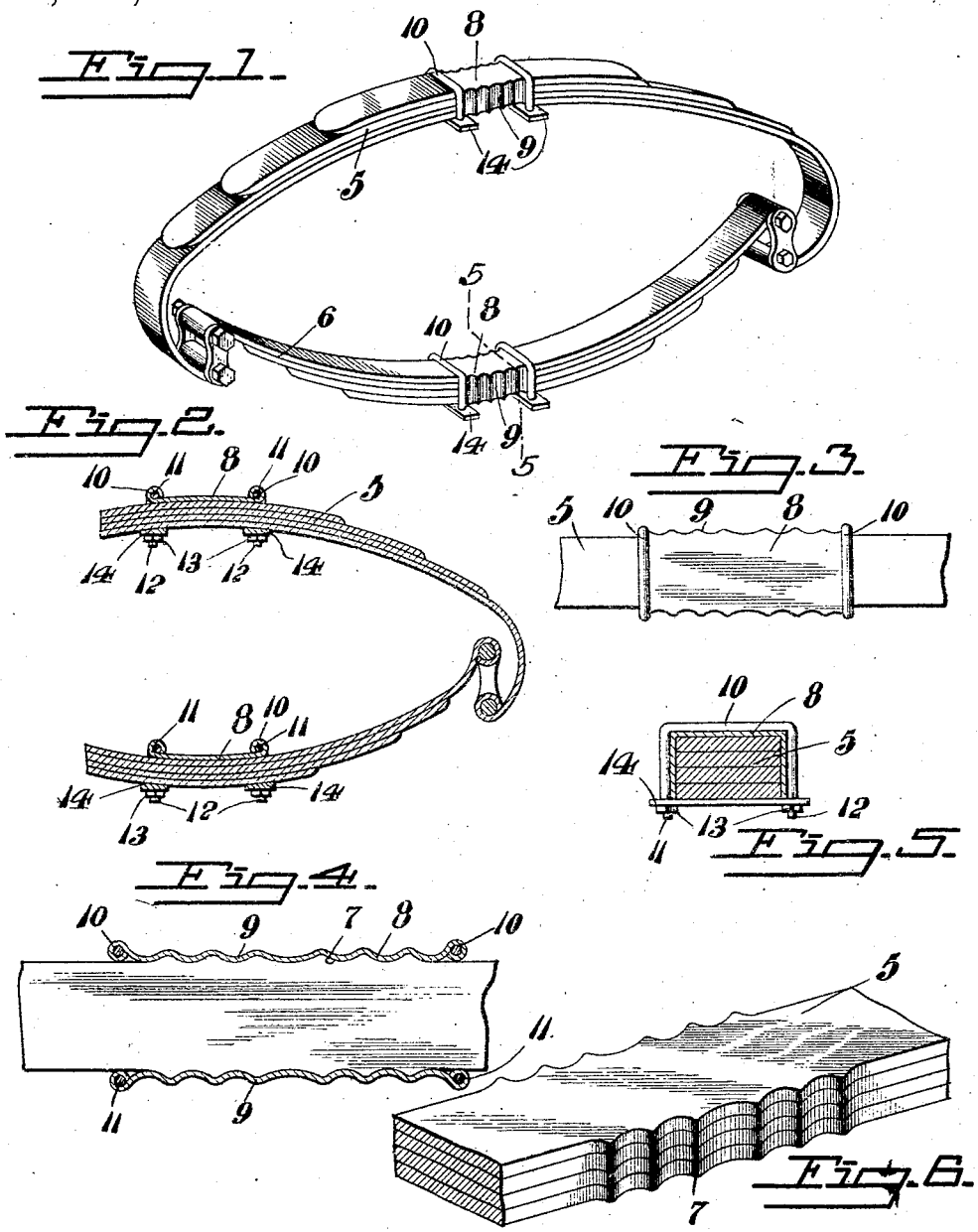

PAUL HAGEMANN, OF DALLAS, TEXAS.

VEHICLE-SPRING.

1,186,393.  Specification of Letters Patent.  Patented June 6, 1916.

Application filed February 9, 1916. Serial No. 77,209.

*To all whom it may concern:*

Be it known that I, PAUL HAGEMANN, a citizen of the United States, residing at Dallas, in the county of Dallas and State of Texas, have invented new and useful Improvements in Vehicle-Springs, of which the following is a specification.

The invention relates to springs, and more particularly to the class of metallic vehicle springs.

The primary object of the invention is the provision of a spring of this character wherein the leaves thereof which are arranged in series and superimposed upon each other will be firmly held together and the spring as a whole will be firmly clamped at the points of connection thereof with the vehicle axle or frame without weakening the spring at this point or points resultant from perforating the same for accommodating a center bolt which as usual is passed therethrough for securing the spring in place.

Another object of the invention is the provision of a spring of this character wherein the same is materially reinforced at the point where it is secured to an axle and also the leaves are prevented from slipping relative to each other and the spring as a whole is prevented from displacement upon the axle or the side beam of the truck frame of the vehicle.

A further object of the invention is the provision of a spring of this character which is simple in construction, reliable and efficient in operation, possessing maximum resiliency, strength and durability and also which is inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the claims appended hereto.

In the accompanying drawings: Figure 1 is a perspective view of a spring embodying the features of the invention; Fig. 2 is a fragmentary vertical longitudinal sectional view thereof; Fig. 3 is a fragmentary plan view; Fig. 4 is a horizontal longitudinal sectional view through the housing or shell embracing the spring; Fig. 5 is a sectional view on the line 5—5 of Fig. 1; Fig. 6 is a fragmentary perspective view of the leaves of the springs arranged in relative position.

Similar reference characters indicate corresponding parts throughout the several views of the drawings.

Referring to the drawings in detail, 5 and 6 designate the upper and lower bowed leaves of an elliptical shaped spring, the leaves being arranged in series and superimposed upon each other in the make-up of the spring. The upper and lower series of leaves are corrugated, at 7, on opposite edges thereof medially of the same for a purpose presently described. Receiving each series of upper and lower leaves 5 and 6 of the spring is a housing or shell 8 preferably made from metal and open at its bottom, the side walls of the said shell 8 being formed with corrugations 9 corresponding to the corrugations 7 on the leaves of the spring. Formed at opposite ends of the housing or shell 8 are casements or hollow beads 10, in which are received U-shaped clips 11 which are formed with threaded ends 12 for accommodating nuts 13 which are adapted to secure upon the clips 11 cross plates 14, the same being suitably perforated to accommodate the limbs of the clips 11, and in this manner the housing or shell 8 is firmly and securely clamped about the series of either of the upper and lower leaves 5 and 6 of the spring. All the leaves of each series are corrugated correspondingly to each other so that when the same are embraced by the housing or shell 8 the said leaves will be prevented from displacement relative to each other, thus avoiding the possibility of the working loose of any one leaf in the series.

It is of course understood that one or more axle clips or clamps can be fastened about a housing or shell and at the points of engagement of the same therewith the corrugations 9 are widened to accommodate the said clamps or clips and likewise the corrugations 7 on opposite edges of the leaves of the spring are correspondingly widened.

When the housing embraces the leaves of the spring the same are firmly held together to prevent slipping of any one or more leaves relative to each other and also the slipping of the spring upon the axle or side beam of the truck frame of the vehicle. By reason of this particular form of clamp or housing the spring is materially reinforced and the necessity of perforating the leaves for the receiving of a bolt to hold the separate spring leaves together is eliminated because in so doing the spring is materially weakened with resultant breaking at this point. Furthermore, the wearing of the leaves of the spring is reduced to a minimum and also the chance for the leaves becoming loose is avoided.

From the foregoing description, taken in connection with the accompanying drawings, the construction and manner of operation of my improved vehicle spring is readily apparent and, therefore, a more extended explanation has been omitted.

Having thus described my invention, I claim:

1. A vehicle spring comprising a plurality of superimposed leaves having opposite corrugated edges for a distance thereof, and a housing embracing the superimposed leaves and having corrugations in correspondence to the corrugations on said leaves.

2. A vehicle spring comprising a plurality of superimposed leaves having opposite corrugated edges for a distance thereof, a housing embracing the superimposed leaves and having corrugations in correspondence to the corrugations on said leaves, and means for firmly clamping the housing about the leaves of the spring.

3. A vehicle spring comprising a plurality of superimposed leaves having opposite corrugated edges for a distance thereof, a housing embracing the superimposed leaves and having corrugations in correspondence to the corrugations on said leaves, means for firmly clamping the housing about the leaves of the spring, and beads formed at the ends of the housing for receiving the said means.

In testimony whereof I affix my signature in presence of two witnesses.

PAUL HAGEMANN.

Witnesses:
L. D. E. SIMPSON,
CHAS. A. DUNN.